(12) United States Patent
Otaka

(10) Patent No.: US 11,805,450 B2
(45) Date of Patent: *Oct. 31, 2023

(54) COMMUNICATION SYSTEM, COMPUTER-READABLE STORAGE MEDIUM, AND INFORMATION PROCESSING METHOD

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,452

(22) Filed: Jul. 14, 2022

(65) Prior Publication Data

US 2022/0353759 A1 Nov. 3, 2022

Related U.S. Application Data

(63) Continuation of application No. 16/907,312, filed on Jun. 22, 2020, now Pat. No. 11,425,615.

(30) Foreign Application Priority Data

Jun. 27, 2019 (JP) ................. 2019-120566

(51) Int. Cl.
*H04L 12/28* (2006.01)
*H04W 36/00* (2009.01)
(Continued)

(52) U.S. Cl.
CPC ... *H04W 36/0058* (2018.08); *H04W 36/0069* (2018.08); *H04W 36/30* (2013.01);
(Continued)

(58) Field of Classification Search
CPC ......... H04W 36/0058; H04W 36/0069; H04W 36/30; H04W 36/38; H04W 64/003
See application file for complete search history.

(56) References Cited

U.S. PATENT DOCUMENTS

| | | |
|---|---|---|
| 10,477,380 B2 | 11/2019 | Adachi |
| 2010/0240317 A1 | 9/2010 | Giles |

(Continued)

FOREIGN PATENT DOCUMENTS

| | | |
|---|---|---|
| CN | 101527947 A | 9/2009 |
| CN | 103327550 A | 9/2013 |

(Continued)

OTHER PUBLICATIONS

Those references were submitted as IDS over the earlier U.S. Appl. No. 16/907,312, filed Jun. 22, 2020.

(Continued)

*Primary Examiner* — Matthew W Genack

(57) ABSTRACT

A communication system is provided, including: an acquiring unit for acquiring quality information on a wireless communication quality between a wireless base station and a movable mobile relaying apparatus that relays communications between the wireless base station and wireless communication terminals; and a transmitting unit for transmitting the quality information to the wireless communication terminals. In addition, an information processing method performed by a computer is provided, the method including: acquiring quality information on a wireless communication quality between a wireless base station and a movable mobile relaying apparatus that relays communications between the wireless base station and wireless communication terminals; and transmitting the quality information to the wireless communication terminals.

5 Claims, 15 Drawing Sheets

(51) Int. Cl.
*H04W 64/00* (2009.01)
*H04W 36/38* (2009.01)
*H04W 36/30* (2009.01)
*H04W 84/00* (2009.01)

(52) U.S. Cl.
CPC ......... *H04W 36/38* (2013.01); *H04W 64/003* (2013.01); *H04W 84/005* (2013.01)

(56) References Cited

U.S. PATENT DOCUMENTS

| | | | |
|---|---|---|---|
| 2011/0124336 A1 | 5/2011 | Ishii | |
| 2011/0228721 A1 | 9/2011 | Shinohara | |
| 2014/0274064 A1 | 9/2014 | Al-Shalash | |
| 2015/0009856 A1 | 1/2015 | Shu | |
| 2015/0181498 A1* | 6/2015 | Li | H04W 36/0058 455/437 |
| 2015/0296390 A1 | 10/2015 | Mino Diaz | |
| 2016/0014626 A1 | 1/2016 | Yi | |
| 2016/0157182 A1* | 6/2016 | Izawa | H04W 52/383 455/522 |
| 2016/0378106 A1* | 12/2016 | Xie | B62J 45/414 701/2 |
| 2017/0111952 A1 | 4/2017 | Choi | |
| 2019/0297547 A1* | 9/2019 | Tsai | H04L 5/0048 |

FOREIGN PATENT DOCUMENTS

| | | | |
|---|---|---|---|
| JP | 2015529424 A | 10/2015 | |
| JP | 2016036107 A | 3/2016 | |
| JP | 2016139911 A | 8/2016 | |
| JP | 2019016904 A | 1/2019 | |
| WO | 2010064716 A1 | 6/2010 | |
| WO | 2016185967 A1 | 11/2016 | |

OTHER PUBLICATIONS

Office Action issued for counterpart Japanese Application No. 2019-120566, issued by the Japan Patent Office dated Apr. 5, 2022 (drafted on Mar. 31, 2022).
Research In Motion, UK Limited,Serving Cell Selection in a Type 1Relay Network(online),3GPP TSG RAN WG2 70 R2-102967,Internet URL:http://www.3gpp.org/ftp/tsg_ran/WG2_RL2/TSGR2_70/Docs/R2-102967.zip, May 4, 2010.
LG Electronics,Discussions on NR IAB support(online),3GPP TSG RANWG1 93 R1-1806649,Internet URL:http://Www.3gpp.org/ftp/tsg_ran/WG1_RL1/TSGR1_93/Docs/R1-1806649.zip, May 12, 2018.
Office Action issued for counterpart Chinese Application 202010463258.0, issued by the China National Intellectual Property Administration dated May 30, 2022.
Office Action issued for counterpart Chinese Application 202010463258.0, issued by the China National Intellectual Property Administration dated Sep. 13, 2022.
Office Action issued for counterpart Japanese Application No. 2019-120566, issued by the Japanese Patent Office dated Oct. 11, 2022 (drafted on Oct. 5, 2022).

* cited by examiner

330

340

COMMUNICATION SYSTEM, COMPUTER-READABLE STORAGE MEDIUM, AND INFORMATION PROCESSING METHOD

CROSS-REFERENCE TO RELATED APPLICATIONS

This application is a continuation of U.S. patent application Ser. No. 16/907,312, filed on Jun. 22, 2020, the entire contents of which are expressly incorporated herein by reference. The application also claims priority from the following Japanese patent application, which is explicitly incorporated herein by reference:
No. 2019-120566 filed in JP on Jun. 27, 2019.

BACKGROUND

1. Technical Field

The present invention relates to a communication system, a computer-readable storage medium, and an information processing method.

2. Related Art

A technique for making a flying mobile base station move to a connection point in a macro-cell and function as a small-cell base station has been known (for example, refer to Patent Literature 1).

PRIOR ART LITERATURE

Patent Literature

[Patent Literature 1] Japanese Unexamined Patent Application Publication No. 2019-016904

DISCLOSURE OF THE INVENTION

Technical Problem

It is preferable to provide a technique capable of appropriately supporting operation of a mobile base station.

DESCRIPTION OF EXEMPLARY EMBODIMENTS

The following describes the present invention through embodiments of the invention, and the below described embodiments do not limit the scope of the invention according to the claims. In addition, not all combinations of features described in the embodiments are necessarily essential to the solution of the invention.

Figure 1:
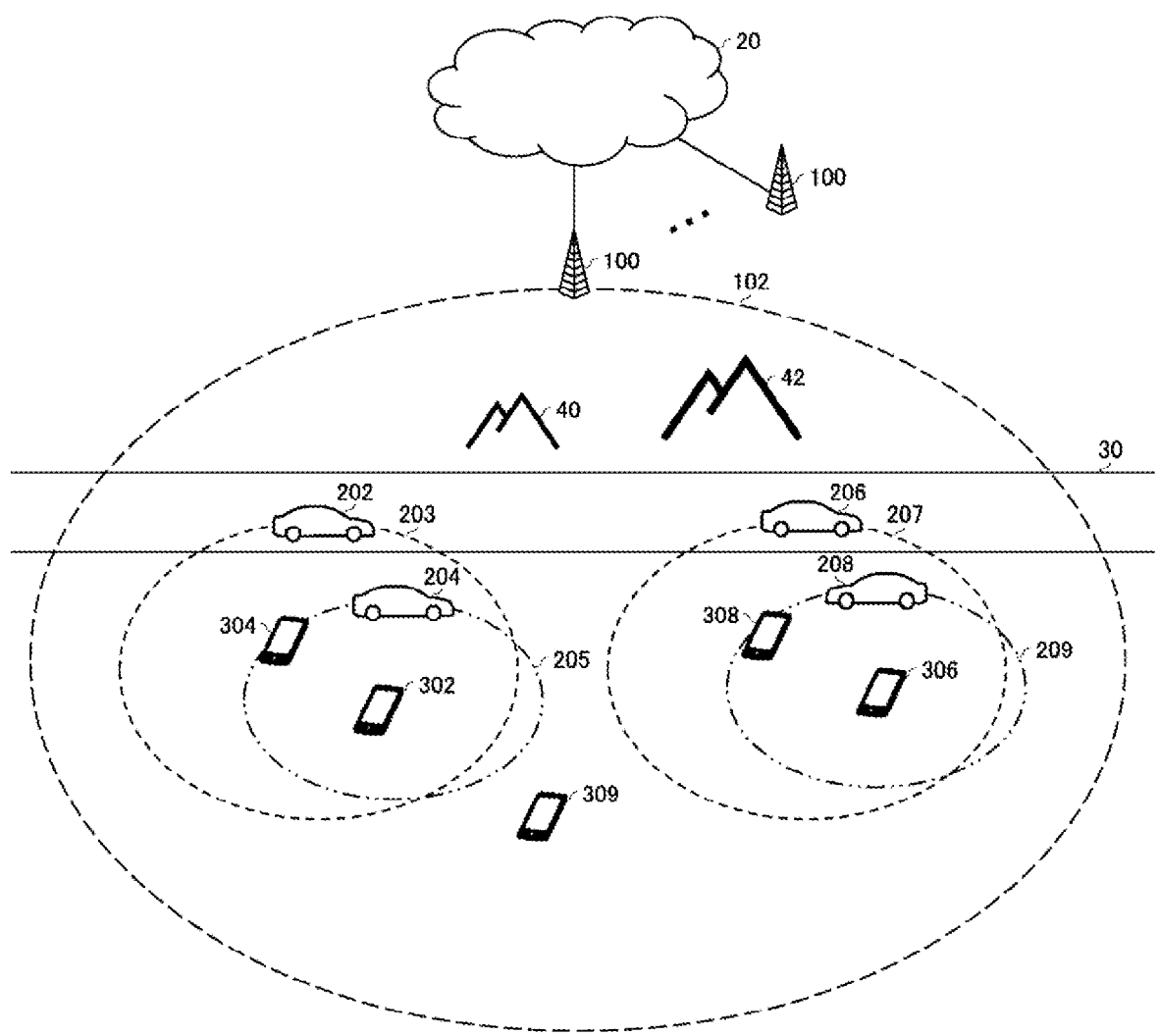
FIG. 1 schematically illustrates an example of a communication system 10.

FIG. 1 schematically illustrates an example of a communication system 10. The communication system 10 may include a wireless base station 100. The communication system 10 may include a plurality of vehicles 200. FIG. 1 illustrates a vehicle 202 and a vehicle 206 located on a road 30 and a vehicle 204 and a vehicle 208, as an example of the plurality of vehicles 200. The communication system 10 may include a plurality of wireless communication terminals 300. FIG. 1 illustrates a wireless communication terminal 302, wireless communication terminal 304, wireless communication terminal 306, and wireless communication terminal 308, as an example of the plurality of wireless communication terminals 300.

The vehicle 200 is camped on a cell 102 of the wireless base station 100, and has a relay function relaying communications between the wireless base station 100 and the wireless communication terminal 300. The cell 102 indicates an area in which wireless communications with the wireless base station 100 is possible. That the vehicle 200 is camped on the cell 102 of the wireless base station 100 may be that the vehicle 200 is located in the cell 102 of the wireless base station 100 and establishes a wireless communication connection with the wireless base station 100. That the vehicle 200 is camped on the cell 102 of the wireless base station 100 may be described as that the vehicle 200 is camped on the wireless base station 100. The cell 102 may be an example of a wireless communication area. The vehicle 200 may be an example of a mobile relaying apparatus.

The vehicle 200 may be camped on another vehicle. For example, in the example illustrated in FIG. 1, the vehicle 204 located in a cell 203 of the vehicle 202 can be camped on the vehicle 202. In addition, the vehicle 208 located in a cell 207 of the vehicle 206 can be camped on the vehicle 206.

The vehicle 200 may be an automobile. The vehicle 200 may be any type of automobile, as long as it has a wireless communication function. For example, the vehicle 200 may be a gasoline-fueled vehicle, or may be a so-called eco-friendly vehicle. The types of the eco-friendly vehicle include HV (Hybrid Vehicle), PHEV/PHV (Plug-in Hybrid Vehicle), EV (Electric Vehicle), FCV (Fuel Cell Vehicle), and the like. The vehicle 200 may be an automobile for any use. For example, the vehicle 200 may be a private vehicle or may be a commercial vehicle such as a sharing-car (including a case of using a private vehicle), a rental car, a taxi, a bus, and a mobile sales vehicle.

The wireless base station 100 may be compliant with any mobile communication method. The wireless base station 100 is compliant with, for example, the 3G (3rd Generation) communication method. The wireless base station 100 is compliant with, for example, the LTE (Long Term Evolution) communication method. The wireless base station 100 may be an eNB (eNodeB). In addition, the wireless base station 100 is compliant with, for example, the 5G (5th Generation) communication method. The wireless base station 100 may be a gNB (gNodeB). The wireless base station 100 is compliant with, for example, a 6G (6th Generation) communication method. The wireless base station 100 may be compliant with a mobile communication method that is a 7G (7th Generation) communication method and beyond. Herein, a case in which the wireless base station 100 is compliant with the LTE communication method is mainly described as an example.

The wireless base station 100 is connected to a network 20. The network 20 includes a mobile communication network. The network 20 may include the internet.

The wireless communication terminal 300 may be any communication terminal, as long as it has a wireless communication function. The wireless communication terminal 300 is, for example, a mobile phone such as a smartphone, a tablet terminal, a wearable terminal, a PC (Personal Computer), and the like. The wireless communication terminal 300 may also be a so-called IoT (Internet of Thing) device.

For example, the vehicle 200 forms a cell, and performs wireless communications with a wireless communication terminal 300 camped on the cell. The cell formed by the vehicle 200 may be smaller than the cell 102 formed by the wireless base station 100. That the wireless communication terminal 300 is camped on the cell of the vehicle 200 may be that the wireless communication terminal 300 is located in the cell and establishes a wireless communication connection with the vehicle 200. That the wireless communication terminal 300 is camped on the cell of the vehicle 200 may be described as that the wireless communication terminal 300 is camped on the vehicle 200.

A communication method of wireless communications between the vehicle 200 and the wireless communication terminal 300 may be the mobile communication method. The vehicle 200 may be referred to as a mobile base station. The mobile communication method between the vehicle 200 and the wireless communication terminal 300 may be the same as the mobile communication method between the vehicle 200 and the wireless base station 100. In addition, the mobile communication method between the vehicle 200 and the wireless communication terminal 300 may be different from the mobile communication method between the vehicle 200 and the wireless base station 100.

A radio-frequency band that the vehicle 200 uses for wireless communications with the wireless communication terminal 300 may be a higher frequency band than a radio-frequency band that the wireless base station 100 uses for wireless communications with the wireless communication terminal 300. For example, the vehicle 200 can perform wireless communications with the wireless communication terminal 300 according to the 5G communication method, and the wireless base station 100 can perform wireless communication with the wireless communication terminal 300 according to the LTE communication method.

A radio-frequency band that the vehicle 200 uses for wireless communications with the wireless communication terminal 300 may be a lower frequency band than a radio-frequency band that the wireless base station 100 uses for wireless communications with the wireless communication terminal 300. For example, the vehicle 200 can perform wireless communications with the wireless communication terminal 300 according to the LTE communication method, and the wireless base station 100 can perform wireless communication with the wireless communication terminal 300 according to the 5G communication method.

The communication method of wireless communications between the vehicle 200 and the wireless communication terminal 300 may be a WiFi (registered trademark) (Wireless Fidelity) communication method. The vehicle 200 may be referred to as a mobile access point.

The mobile relaying apparatus like the vehicle 200 moves, so that its communication environment is unstable. In addition, as before, in a case that the vehicle 200 is camped on the wireless base station 100 and the wireless communication terminal 300 is camped on the vehicle 200, the wireless communication terminal 300 only knows a communication situation with a vehicle 200 directly connected. As a result, even if a radio wave reception-intensity displayed on the wireless communication terminal 300 is maximum, communication sensitivity in an area that lies beyond there, that is, between the vehicle 200 and the wireless base station 100, may be significantly low. Further, since such a situation is not displayed to a user of the wireless communication terminal 300, the user does not know the situation. Even if the radio wave reception-intensity displayed on the wireless communication terminal 300 is a medium level at another vehicle 200, the vehicle 200 may be optimum considering the communication situation in an area that lies beyond there, that is, between the vehicle 200 and the wireless communication terminal 300.

The wireless base station 100 according to this embodiment acquires quality information on a wireless communication quality between the wireless base station 100 and the vehicle 200 to transmit the quality information to the wireless communication terminal 300. For example, the wireless base station 100 receives, from the vehicle 200, a reception-intensity of a radio wave from the wireless base station 100 at the vehicle 200, to transmit the radio wave reception-intensity to the wireless communication terminal 300. This can cause a user of the wireless communication terminal 300 to know the communication situation in an area that lies beyond the vehicle 200 to which the wireless communication terminal 300 directly connects, and can provide the user with information on the vehicle 200 that needs to be actually selected.

Figure 2:
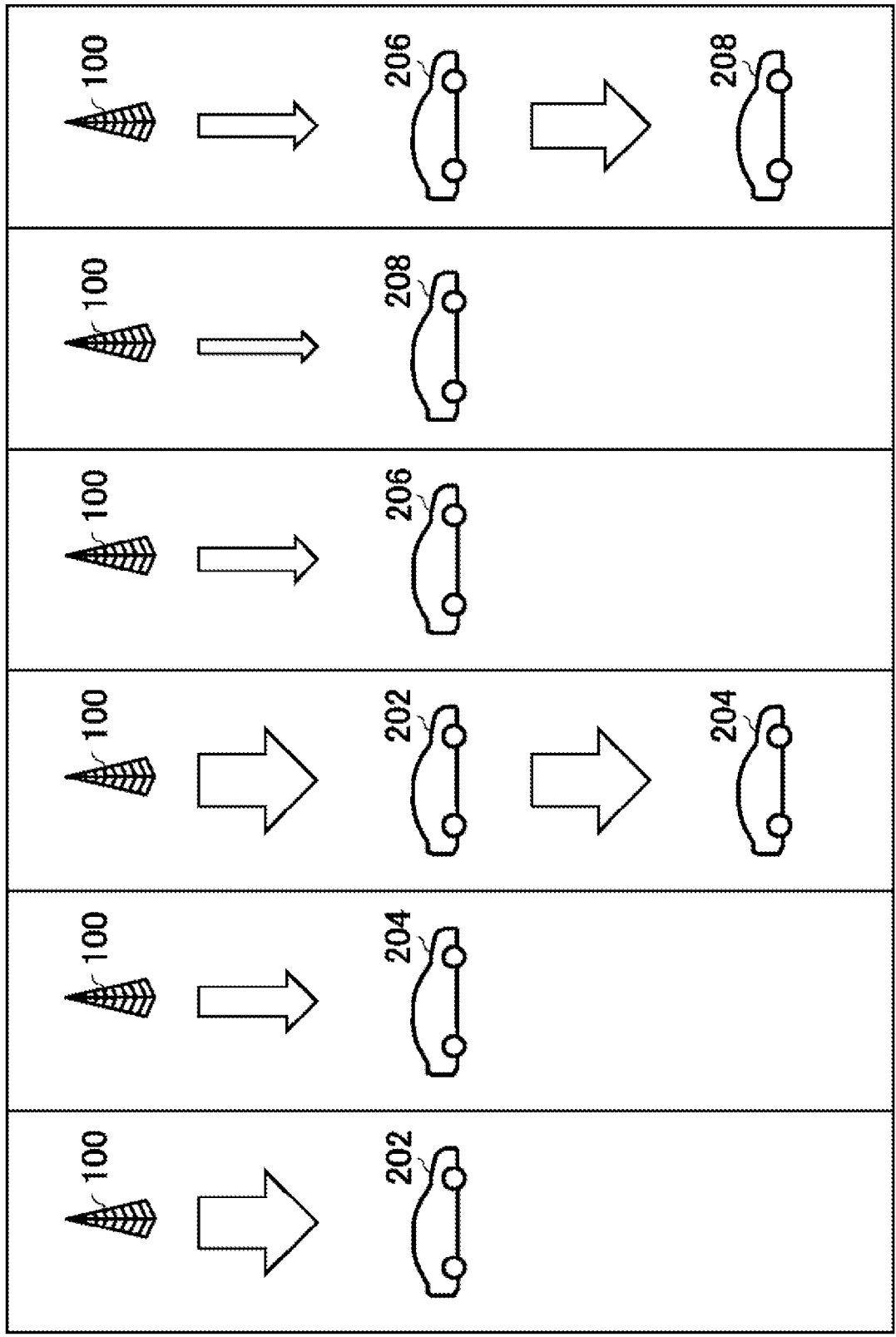
FIG. 2 schematically illustrates radio wave reception-intensities of a vehicle 200 etc. in the situation showing in FIG. 1.

FIG. 2 illustrates examples of radio wave reception-intensities in the situation shown in FIG. 1. In FIG. 2, each arrow represents a radio wave reception-intensity. The arrow indicates that as it is thicker, the radio wave reception-intensity is stronger.

As shown in FIG. 1 and FIG. 2, since the visibility between the vehicle 202 and the wireless base station 100 is good, the reception-intensity of the radio wave from the wireless base station 100 at the vehicle 202 is stronger. The reception-intensity of the radio wave from the wireless base station 100 at the vehicle 204 is weaker due to presence of a mountain 40. Since the reception-intensity of the radio wave from the vehicle 202 at the vehicle 204 is stronger, the vehicle 204 can have a higher communication quality when connected to the wireless base station 100 via the vehicle 200 than when directly connected to the wireless base station 100. Both the reception-intensity of the radio wave from the wireless base station 100 at the vehicle 206 and the reception-intensity of the radio wave from the wireless base station 100 at the vehicle 208 are very weak due to presence of a mountain 42.

For example, the wireless base station 100 broadcasts these radio wave reception-intensities to the wireless communication terminal 300 camped on the wireless base station 100. For example, the wireless communication terminal 300 selects only radio wave reception-intensities related to itself among the received radio wave reception-intensities to provide them to a user. For example, the wireless communication terminal 302 selects reception-intensities of radio waves which are related to the vehicle 202 and the vehicle 204 that are receiving radio waves, that is, the reception-intensity of the radio wave from the wireless base station 100 at the vehicle 202, the reception-intensity of the radio wave from the wireless base station 100 at the vehicle 204, and the reception-intensity of the radio wave from the vehicle 202 at the vehicle 204, to provide them to the user.

In addition to the radio wave reception-intensity, the wireless base station 100 may transmit location information of the vehicle 200 to the wireless communication terminal 300. In addition to the radio wave reception-intensity, the wireless communication terminal 300 may provide the location information of the vehicle 200 to the user. For example, the wireless communication terminal 309 provides, to the user, each piece of location information of the vehicle 202, the vehicle 204, the vehicle 206, and the vehicle 208 and the radio wave reception-intensities shown in FIG. 2. A user of the wireless communication terminal 309 can know that, for example, it is likely for the user to be able to communicate in better communication environment by moving in a direction of the vehicle 202 than by moving in a direction of the vehicle 206.

Figure 3:
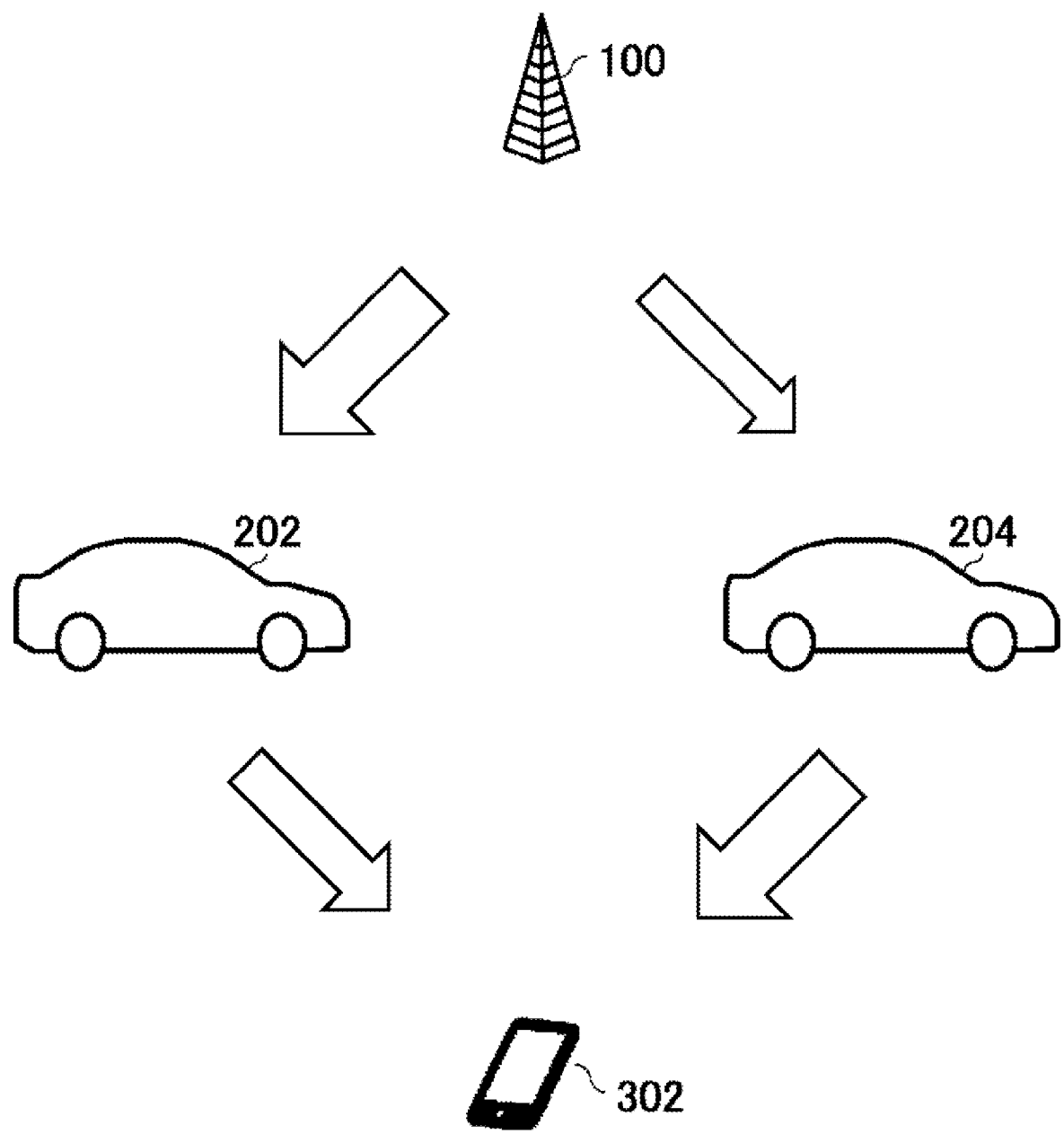
FIG. 3 schematically illustrates radio wave conditions of two communication paths from a wireless base station 100 to a wireless communication terminal 300.

FIG. 3 schematically illustrates radio wave conditions of two communication paths from a wireless communication terminal 302 to the wireless base station 100. The wireless communication terminal 300 can be camped on any of the vehicle 202 and the vehicle 204, but a reception-intensity of a radio wave from the vehicle 202 is weaker than a reception-intensity of a radio wave from the vehicle 204. A conventional wireless communication terminal 300 can display a reception-intensity of a radio wave from the vehicle 202 and a reception-intensity of a radio wave from the vehicle 204, but was unable to display a reception-intensity of a radio wave from the wireless base station 100 at the vehicle 202 and a reception-intensity of a radio wave from the wireless base station 100 at the vehicle 204. Thus, a user of the wireless communication terminal 302 tended to select the vehicle 204 whose radio wave reception-intensity is stronger, as a connection destination. As a result, even if the displayed radio wave reception-intensity is high, a situation of a communication condition being poor occurs, so that user experience sometimes decreases.

On the other hand, in the wireless base station 100 according to this embodiment, a reception-intensity of a radio wave from the wireless base station 100 at the vehicle 202 and a reception-intensity of a radio wave from the wireless base station 100 at the vehicle 204 are informed to the wireless communication terminal 300. This can cause, for example, when the communication condition of the wireless communication terminal 300 that is camped on the vehicle 204 is poor, the user to know the reason. In addition, the user can select a connection destination, considering not only a reception-intensity of a radio wave from the vehicle 200, but also a reception-intensity of a radio wave from the wireless base station 100 at the vehicle 200.

Figure 4:
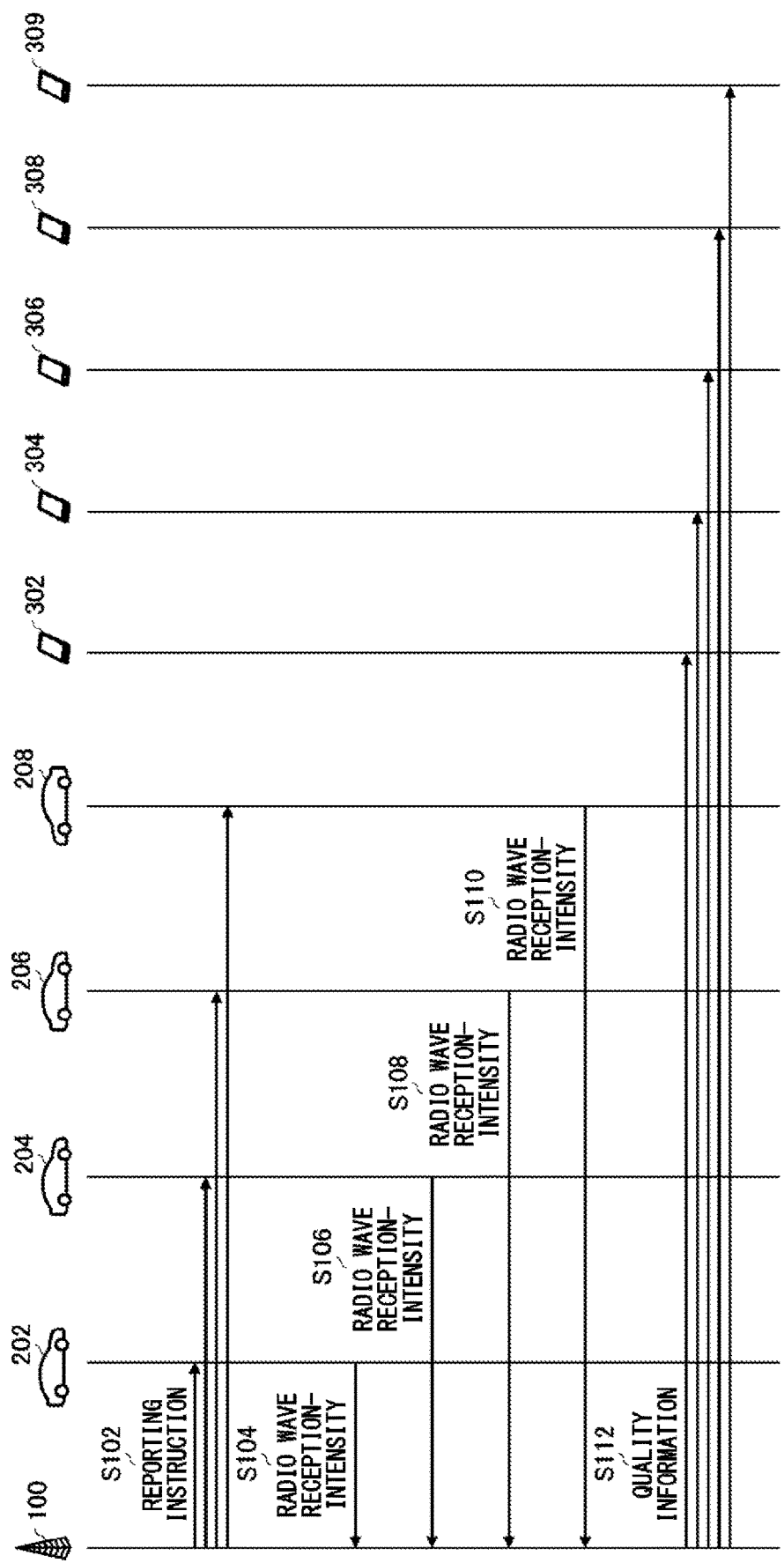
FIG. 4 schematically illustrates an example of a flow of processes performed by the communication system 10 in the situation shown in FIG. 1.

FIG. 4 schematically illustrates an example of a flow of processes performed by the communication system 10 in the situation shown in FIG. 1. Herein, in a situation that the vehicle 202, the vehicle 204, the vehicle 206, and the vehicle 208 are camped on the wireless base station 100, a flow of processes in a case that each radio wave reception-intensity is broadcasted with the wireless base station 100 as the origin to the wireless communication terminal 300 camped on the wireless base station 100 is described.

At step (steps may be abbreviated as "S") 102, the wireless base station 100 transmits reporting instructions of radio wave reception-intensities to the vehicle 202, the vehicle 204, the vehicle 206 and the vehicle 208.

At S104, in response to the reporting instruction, the vehicle 202 transmits, to the wireless base station 100, a reception-intensity of a radio wave from the wireless base station 100. At S106, in response to the reporting instruction, the vehicle 204 transmits, to the wireless base station 100, a reception-intensity of a radio wave from the wireless base station 100. At S108, in response to the reporting instruction, the vehicle 206 transmits, to the wireless base station 100, a reception-intensity of a radio wave from the wireless base station 100. At S110, in response to the reporting instruction, the vehicle 208 transmits, to the wireless base station 100, a reception-intensity of a radio wave from the wireless base station 100.

At S112, the wireless base station 100 broadcasts quality information including the radio wave reception-intensities received at S104, S106, S108, and S110 to the wireless communication terminal 302, the wireless communication terminal 304, the wireless communication terminal 306, the wireless communication terminal 308, and the wireless communication terminal 309, which are camped on the wireless base station 100.

In FIG. 4, the flow of collecting various radio wave reception-intensities with the wireless base station 100 as the origin to inform the wireless communication terminal 300 of them is described, but the flow is not limited thereto. In response to have received, from the wireless communication terminal 300, a measurement report (which may be referred to as a Measurement Report) that reports a situation of a radio wave that the wireless communication terminal 300 receives, the wireless base station 100 may collect the reception-intensities of the radio wave from the wireless base station 100 at the vehicle 200, which are included in the measurement report, to inform the wireless communication terminal 300 of them.

Figure 5:
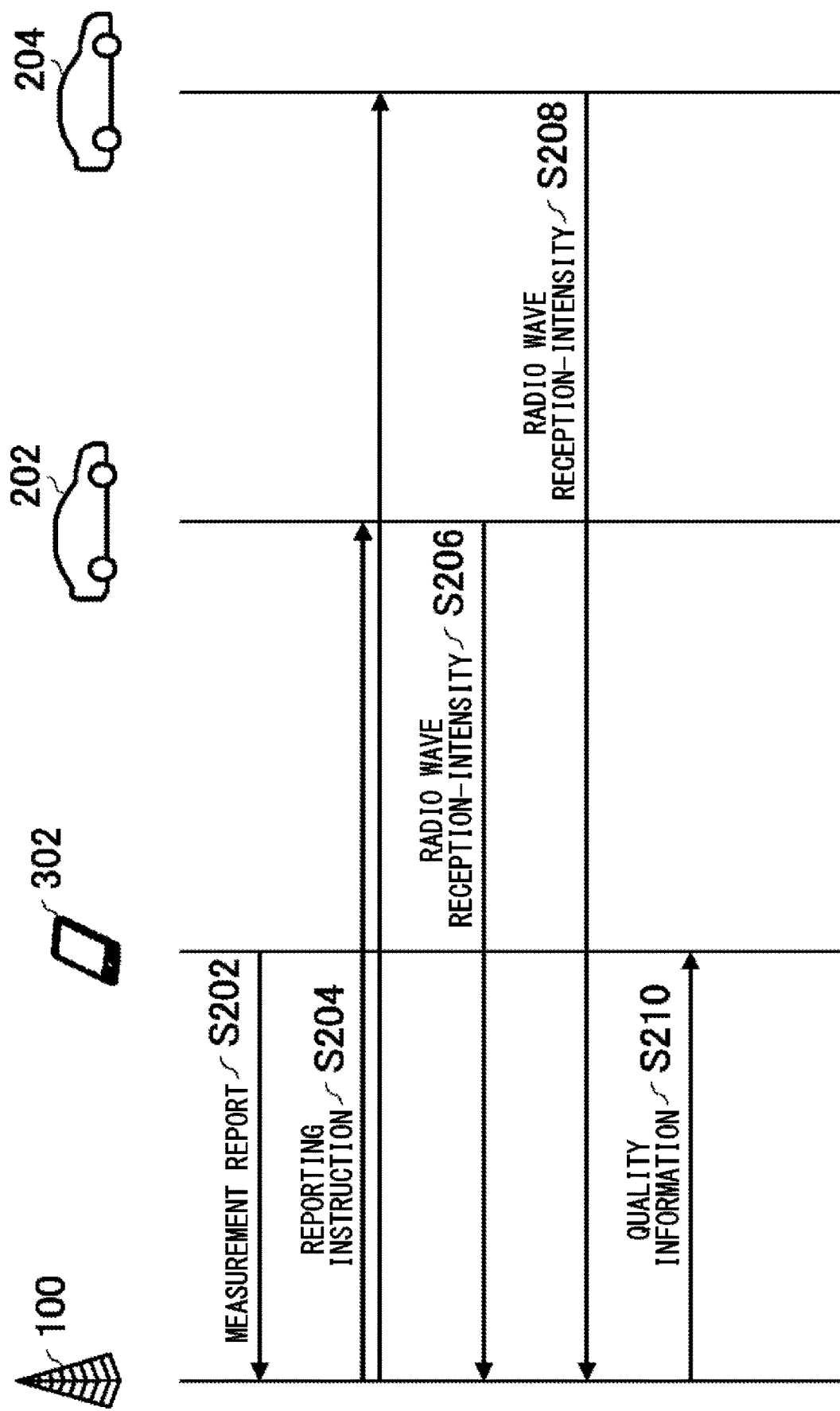
FIG. 5 schematically illustrates an example of a flow of processes performed by the communication system 10 in the situation shown in FIG. 1.

FIG. 5 schematically illustrates an example of a flow of processes performed by the communication system 10 in the situation shown in FIG. 1. At S202, the wireless communication terminal 302 transmits a measurement report to the wireless base station 100. The wireless communication terminal 302 is located in a cell 203 of the vehicle 202 and a cell 205 of the vehicle 204, and the measurement report includes a reception-intensity of a radio wave from the vehicle 202 and identification of the vehicle 202, and a reception-intensity of a radio wave from the vehicle 204 and identification of the vehicle 204.

At S204, the wireless base station 100 identifies the vehicle 202 and the vehicle 204 by using identification included in the measurement report to transmit reporting instructions of the radio wave reception-intensity to the vehicle 202 and the vehicle 204. At S206, in response to the reporting instruction, the vehicle 202 transmits the reception-intensity of the radio wave from the wireless base station 100 to the wireless base station 100. At S208, in response to the reporting instruction, the vehicle 204 transmits the reception-intensity of the radio wave from the wireless base station 100 to the wireless base station 100.

At S210, the wireless base station 100 transmits, to the wireless communication terminal 302, quality information including the radio wave reception-intensity received at S206 and the radio wave reception-intensity received at S208.

Figure 6:
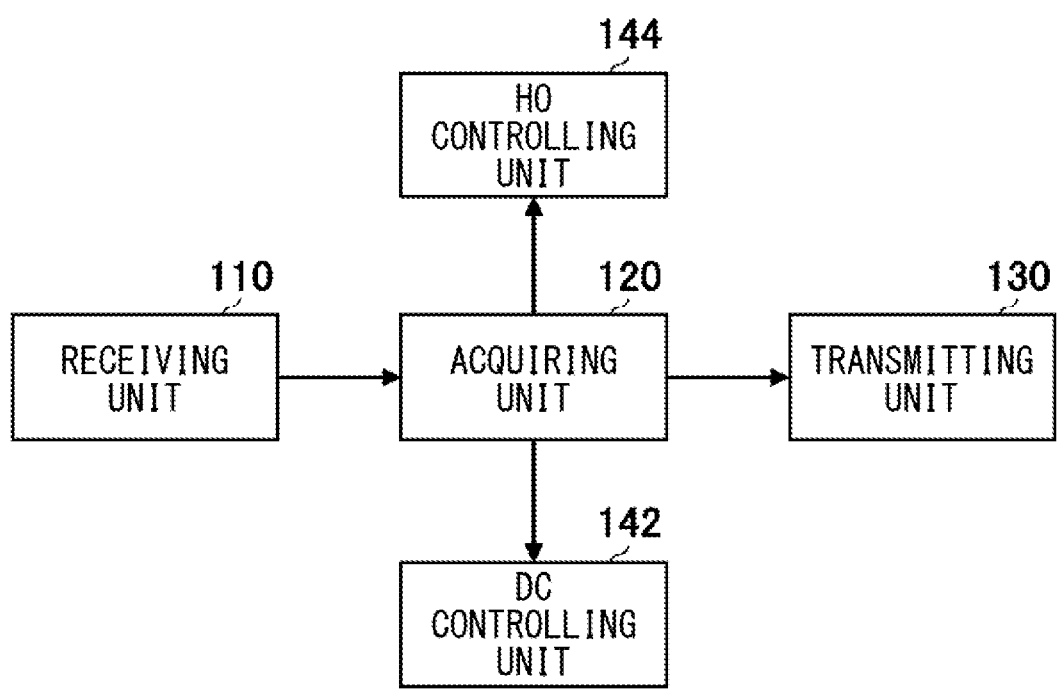
FIG. 6 schematically illustrates an example of a functional configuration of the wireless base station 100.

FIG. 6 schematically illustrates an example of a functional configuration of the wireless base station 100. The wireless base station 100 includes a receiving unit 110, an acquiring unit 120, a transmitting unit 130, a DC (Dual Connectivity) controlling unit 142, and a HO (Hand Over) controlling unit 144.

The receiving unit 110 receives various pieces of information. The receiving unit 110 receives, for example, quality information. The receiving unit 110 may receive the quality information from a mobile relaying apparatus. The receiving unit 110 receives, for example, the quality information from a vehicle 200. The quality information includes, for example, a reception-intensity of a radio wave from the wireless base station 100 at the vehicle 200. The quality information may include noise information in wireless communications between the vehicle 200 and the wireless base station 100. The quality information may include communication speed information indicating a communication speed of wireless communications between the vehicle 200 and the wireless base station 100.

In addition, the receiving unit 110 receives, for example, a measurement report. The receiving unit 110 may receive the measurement report from the wireless communication terminal 300.

In addition, the receiving unit 110 receives, for example, apparatus information related to the mobile relaying apparatus. The receiving unit 110 may receive the apparatus information from the mobile relaying apparatus. The receiving unit 110 receives, for example, the apparatus information from the vehicle 200.

The apparatus information may include location information of the mobile relaying apparatus. In addition, the apparatus information may include movement-related information related to movements of the mobile relaying apparatus.

The movement-related information includes, for example, moving speed information related to a moving speed of the mobile relaying apparatus. The moving speed information may indicate a moving speed of the mobile relaying apparatus at any timing. In addition, the moving speed information may indicate an average speed of the moving speed of the mobile relaying apparatus in a predetermined time period.

In addition, the movement-related information includes, for example, moving direction information related to a moving direction of the mobile relaying apparatus. The moving direction information may indicate a moving direction of the mobile relaying apparatus at any timing. In addition, the moving direction information may indicate a planned route for the mobile relaying apparatus to move. For example, when the mobile relaying apparatus is the vehicle 200, the moving direction information may be route information indicating a route to a movement destination of the vehicle 200 that is set to the vehicle 200.

The acquiring unit 120 acquires various pieces of information. The acquiring unit 120 acquires, for example, the quality information received by the receiving unit 110. In addition, the acquiring unit 120 acquires, for example, the measurement report received by the receiving unit 110. In addition, the acquiring unit 120 acquires, for example, the apparatus information received by the receiving unit 110.

The transmitting unit 130 transmits various pieces of information. The transmitting unit 130 transmits, for example, the quality information acquired by the acquiring unit 120 to the wireless communication terminal 300. In addition, the transmitting unit 130 transmits, for example, the apparatus information acquired by the acquiring unit 120 to the wireless communication terminal 300. The transmitting unit 130 may transmit the quality information along with the apparatus information to the wireless communication terminal 300. The transmitting unit 130 transmits, for example, the quality information and the location information to the wireless communication terminal 300. In addition, the transmitting unit 130 transmits, for example, the quality information and the movement-related information to the wireless communication terminal 300.

The acquiring unit 120 causes the transmitting unit 130 to transmit a reporting instruction of the quality information to the vehicle 200 camped on the wireless base station 100, for example, according to an instruction from an administrator or the like of the wireless base station 100. In addition, the acquiring unit 120 causes the transmitting unit 130 to transmit a reporting instruction of the quality information to the vehicle 200 camped on the wireless base station 100, for example, according to a predetermined schedule. The acquiring unit 120 acquires, from the receiving unit 110, the quality information transmitted by the vehicle 200 in response to the reporting instruction. Then, the acquiring unit 120 causes the transmitting unit 130 to broadcast the acquired quality information to the wireless communication terminal 300 camped on the wireless base station 100.

In addition, for example, when the receiving unit 110 receives the measurement report, the acquiring unit 120 causes the transmitting unit 130 to transmit a reporting instruction of the quality information to the vehicle 200 identified by the identification included in the measurement report. The acquiring unit 120 acquires, from the receiving unit 110, the quality information transmitted by the vehicle 200 in response to the reporting instruction. Then, the acquiring unit 120 causes the transmitting unit 130 to transmit the acquired quality information to the wireless communication terminal 300 that has transmitted the measurement report.

The DC controlling unit 142 performs control such that the DC is provided to the wireless communication terminal 300 with the vehicle 200 as a secondary cell. The wireless base station 100 can function as a primary cell, while the vehicle 200 can function as a secondary cell.

When the wireless base station 100 and the vehicle 200 are compliant with the LTE communication method, the wireless base station 100 may be referred to as an MeNB (Master eNB) and the vehicle 200 may be referred to as an SeNB (Secondary eNB). When the wireless base station 100 and the vehicle 200 are compliant with the 5G communication method, the wireless base station 100 may be referred to as an MgNB (Master gNB) and the vehicle 200 may be referred to as an SgNB (Secondary gNB). When the wireless base station 100 is compliant with the LTE communication method and the vehicle 200 is compliant with the 5G communication method, the wireless base station 100 may be referred to as an MeNB and the vehicle 200 may be referred to as an SgNB. When the wireless base station 100 is compliant with the 5G communication method and the vehicle 200 is compliant with the LTE communication method, the wireless base station 100 may be referred to as an MgNB and the vehicle 200 may be referred to as an SeNB.

When a plurality of vehicles 200 is located around the wireless communication terminal 300, the DC controlling unit 142 may have a function for selecting, from the plurality of vehicles 200, a vehicle 200 suitable as a secondary cell used in a case of providing the DC to the wireless communication terminal 300. The DC controlling unit 142 can select, as a secondary cell, a vehicle 200 whose wireless communication quality with the wireless base station 100 is higher than those of other vehicles 200. For example, the wireless base station 100 selects, as a secondary cell, a vehicle 200 whose reception-intensity of a radio wave from the wireless base station 100 is the highest.

The DC controlling unit 142 may select a vehicle 200 in response to a request from the wireless communication terminal 300. For example, a user of the wireless communication terminal 300 who has referred to the radio wave reception-intensity provided by the wireless communication terminal 300 selects a vehicle 200 considering the reception-intensity of a radio wave from the wireless base station 100 at the vehicle 200 and the reception-intensity of a radio wave from the vehicle 200 at the wireless communication terminal 300, and the wireless communication terminal 300 transmits a request that has specified the selected vehicle 200 as a secondary cell to the wireless base station 100. The DC controlling unit 142 selects the specified vehicle 200 as a secondary cell, according to the request.

Traditional views about DC are on the premise that both the primary cell and the secondary cell are stationary base stations, and the combination between the primary cell and the secondary cell is determined in advance. On the other hand, as exemplified in this embodiment, when a vehicle 200 camped on the wireless base station 100 that is the primary cell is used as a secondary cell, a communication quality of wireless communications between the wireless base station 100 and the vehicle 200 can change accordingly as the vehicle 200 moves.

For example, when a vehicle 200 is selected as a secondary cell, where reception-intensity of the radio wave from the vehicle 200 at the wireless communication terminal 300 is the strongest, and when the reception-intensity of the radio wave from the wireless base station 100 at the vehicle 200 is weaker, a communication speed between the wireless communication terminal 300 and the vehicle 200 can become high, but a communication speed between the vehicle 200 and the wireless base station 100 becomes low. As a result, a data communication speed by the wireless communication terminal 300 becomes low and a quality of experience of a user of the wireless communication terminal 300 decreases. Particularly, in an existing wireless communication terminal 300, a reception-intensity of the radio wave from the vehicle 200 is indicated, but a reception-intensity of the radio wave from the wireless base station 100 at the vehicle 200 is not indicated. As a result, the data communication speed is slow even if the indicated radio wave reception-intensity is strong, so that the quality of experience of the user of the wireless communication terminal 300 can become lower. On the other hand, in the wireless base station 100 according to this embodiment, the reception-intensity of the radio wave from the wireless base station 100 at the vehicle 200 is informed to the wireless communication terminal 300, and a vehicle 200 whose reception-intensity of the radio wave from the wireless base station 100 is higher than those of other vehicles 200 is selected as a secondary cell, so that the occurrence of this sort of problem can be reduced.

The DC controlling unit 142 performs control such that the DC is provided to the wireless communication terminal 300 with the selected vehicle 200 as a secondary cell. The DC controlling unit 142 registers the selected vehicle 200 as a secondary cell.

The DC controlling unit 142 transmits a DC-setting request to the vehicle 200. The DC controlling unit 142 receives a response signal, transmitted by the vehicle 200, corresponding to the DC-setting request. The response signal includes radio parameter information and the like of a cell of the vehicle 200. The DC controlling unit 142 transmits a setting signal of the radio resource to the wireless communication terminal 300, in response to receiving the response signal from the vehicle 200. The DC controlling unit 142 receives a completion notice, transmitted by the vehicle 200, corresponding to the setting signal. The DC controlling unit 142 transmits a completion notice to the vehicle 200, in response to receiving a completion notice. After transmitting the completion notice, the DC controlling unit 142 distributes, to the vehicle 200, data for the wireless communication terminal 300 received from an SGW.

The HO controlling unit 144 controls a handover of the wireless communication terminal 300. When other vehicles 200 are located around the wireless communication terminal 300 camped on the vehicle 200, the HO controlling unit 144 selects a handover destination of the wireless communication terminal 300 from the other vehicle 200. For example, the HO controlling unit 144 selects, as a handover destination of the wireless communication terminal 300, a vehicle 200 whose reception-intensity of a radio wave from the wireless base station 100 is stronger among the plurality of vehicles 200 whose identifications are included in the measurement report by the wireless communication terminal 300.

The HO controlling unit 144 performs control such that the handover destination of the wireless communication terminal 300 becomes the selected vehicle 200. The HO controlling unit 144 controls, for example, such that the handover destination of the wireless communication terminal 300 becomes the vehicle 200 by including the identification of the selected vehicle 200 in a neighboring-cell list transmitted to the wireless communication terminal 300.

Figure 7:
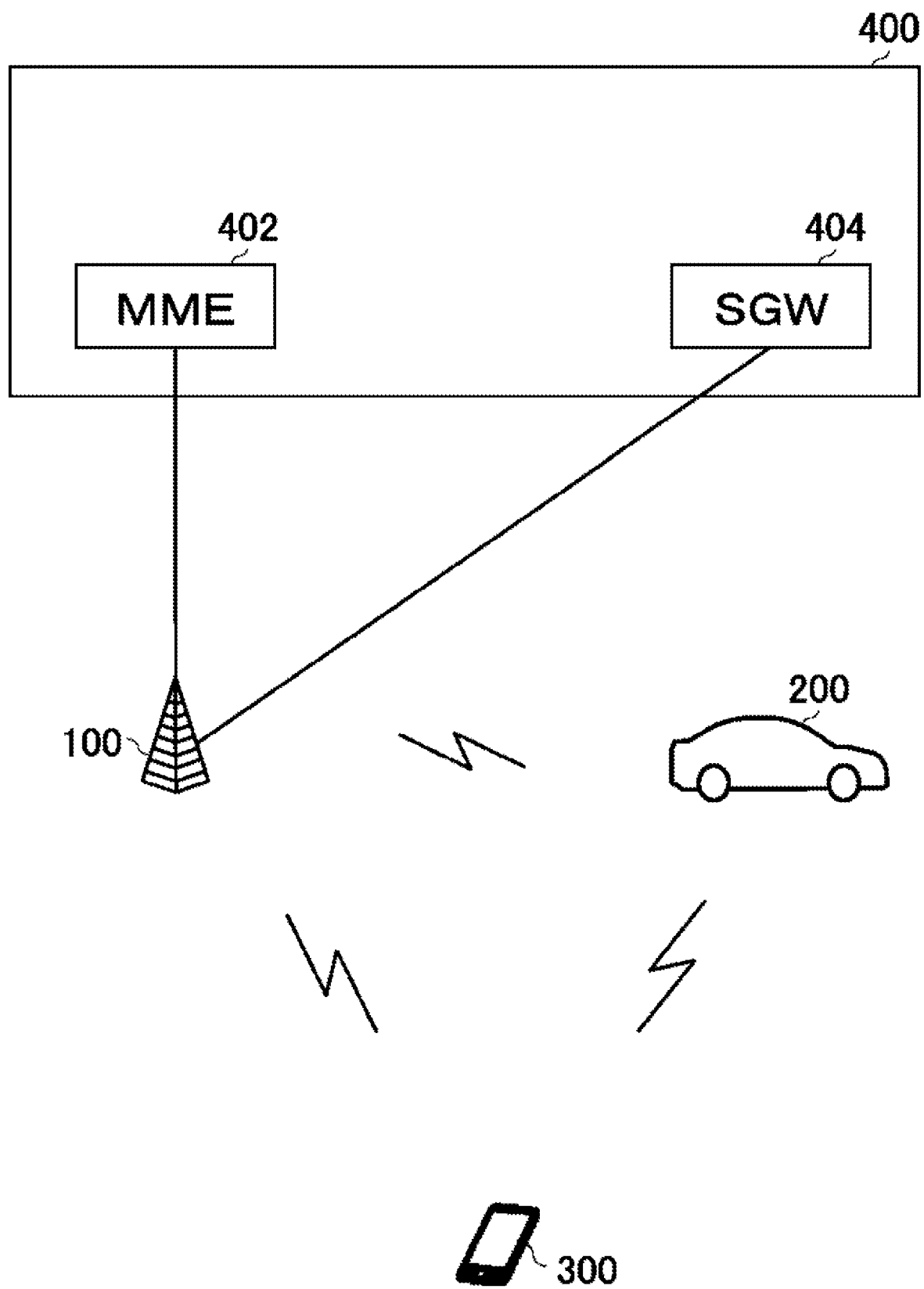
FIG. 7 is an illustration for describing dual connectivity provided to the wireless communication terminal 300 by the wireless base station 100.

FIG. 7 is an illustration for describing the dual connectivity provides to the wireless communication terminal 300 by the wireless base station 100. Herein, a case that the wireless base station 100 selects the vehicle 200 as a secondary cell is described as an example.

In the example shown in FIG. 7, the wireless base station 100 is connected with an MME 402 in an EPC 400 via the S1-C interface and connected with an SGW 404 in the EPC 400 via the S1-U interface. The EPC 400 may be included in the communication system 10. The MME 402 may be included in the communication system 10. For the C-plane, the RRC establishment is performed only between the MME 402 and the wireless base station 100, and the controlling of vehicle 200 is performed via the wireless base station 100.

The wireless base station 100 and the vehicle 200 may be connected via the X2-C interface.

For the U-plane, the wireless base station 100 distributes, to the vehicle 200, data for the wireless communication terminal 300 received from the SGW 404 via the S1-U interface. The wireless base station 100 and the vehicle 200 may be connected via the X2-U interface. The vehicle 200 transmits, to the wireless communication terminal 300, data distributed from the wireless base station 100.

Note that the configuration illustrated in FIG. 7 is merely an exemplification, and another configuration may be adopted. For example, the interfaces used connections between respective components are not limited to the interfaces described above, and other interfaces may be adopted. In addition, for example, when the vehicle 200 and the SGW 404 are capable of communicating in different paths, data for the wireless communication terminal 300 may be transmitted from the SGW 404 to the vehicle 200 without the wireless base station 100.

Figure 8:
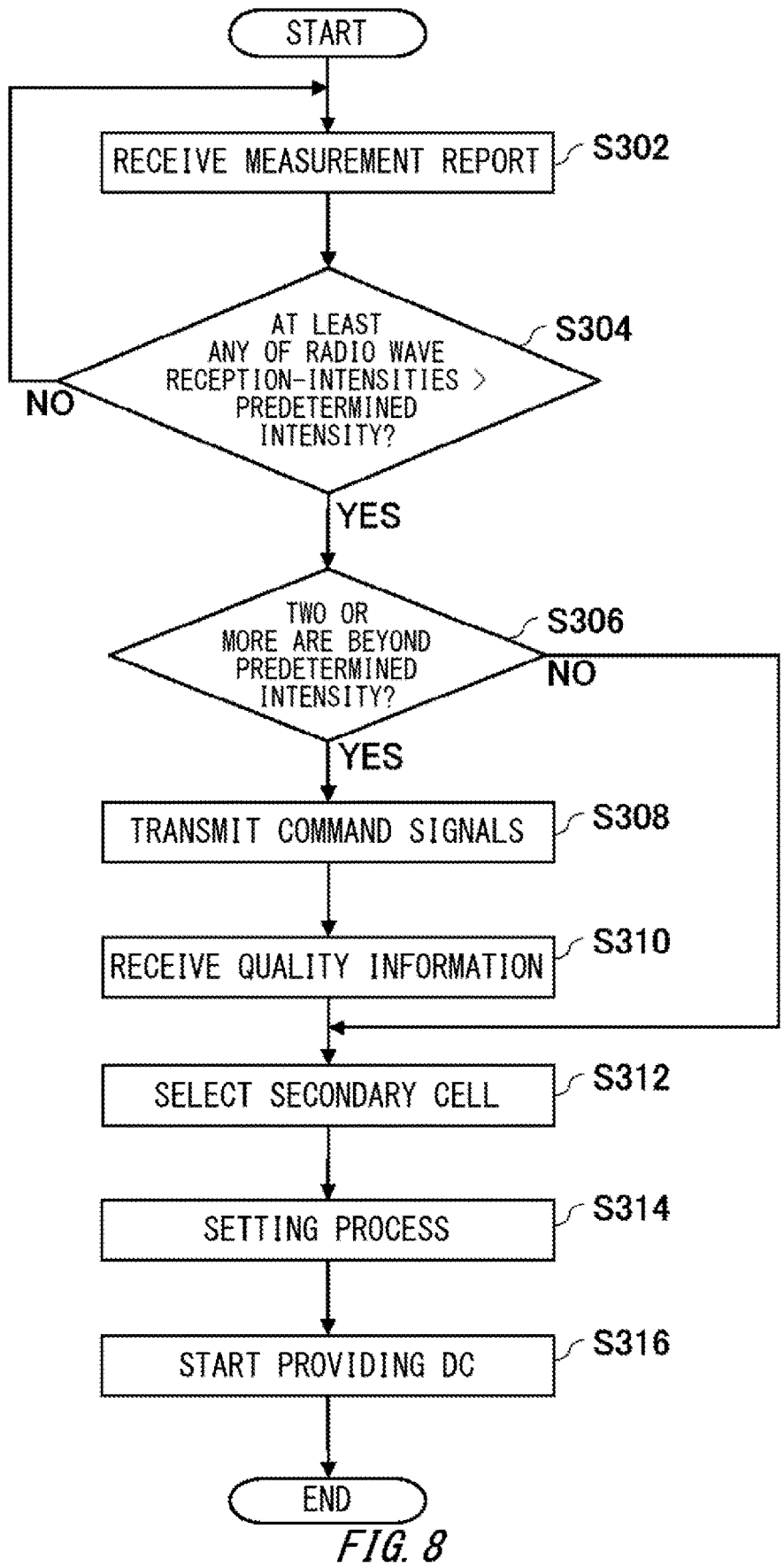
FIG. 8 schematically illustrates an example of a flow of processes performed by the wireless base station 100.

FIG. 8 schematically illustrates an example of a flow of processes performed by the wireless base station 100. Herein, a condition in which the wireless communication terminal 300 and a plurality of vehicles 200 are camped on the wireless base station 100 is a starting condition, and an example of a flow of processes is described until DC for the wireless communication terminal 300 starts to be provided.

At S302, the receiving unit 110 receives a measurement report from the wireless communication terminal 300. At S304, the receiving unit 110 determines whether at least any of one or more radio wave reception-intensities included in the measurement report is stronger than a predetermined intensity. If no, return to S302, or if yes, proceed to S306.

At S306, the receiving unit 110 determines whether the number of vehicles 200 whose radio wave reception-intensities are stronger than the predetermined intensity are plural. If yes, proceed to S308, or if no proceed to S312.

At S308, the transmitting unit 130 transmits reporting instructions of the quality information to the plurality of vehicles 200 whose radio wave reception-intensities are stronger than the predetermined intensity. At S310, the receiving unit 110 receives the quality information transmitted by each of the plurality of vehicles 200 in response to the reporting instructions transmitted by the transmitting unit 130 at S308.

At S312, the DC controlling unit 142 selects a secondary cell. When it is determined at S306 that the number of vehicles 200 whose radio wave reception-intensities included in the quality information are stronger than the predetermined intensity is not plural, the DC controlling unit 142 selects one vehicle 200 whose radio wave reception-intensity is stronger than the predetermined intensity, as a secondary cell. When it is determined at S306 that the number of vehicles 200 whose radio wave reception-intensities are stronger than the predetermined intensity is plural, the DC controlling unit 142 selects a secondary cell among the plurality of vehicles 200.

The DC controlling unit 142 may select a secondary cell among the plurality of vehicles 200, based on the quality information received at S310. The DC controlling unit 142 may select a secondary cell among the plurality of vehicles 200, further based on the measurement report received at S302. When the quality information received at S310 includes a moving speed of the vehicle 200, the DC controlling unit 142 may select a secondary cell among the plurality of vehicles 200, further based on the moving speed. For example, the DC controlling unit 142 selects a secondary cell among the plurality of vehicles 200, with a vehicle 200 whose moving speed is slower given priority to.

At S314, the DC controlling unit 142 registers the vehicle 200 selected at S312 as a secondary cell to perform a setting process. At S316, the DC controlling unit 142 starts providing DC to the wireless communication terminal 300, along with the vehicle 200 whose setting process is complete at S314.

Figure 9:
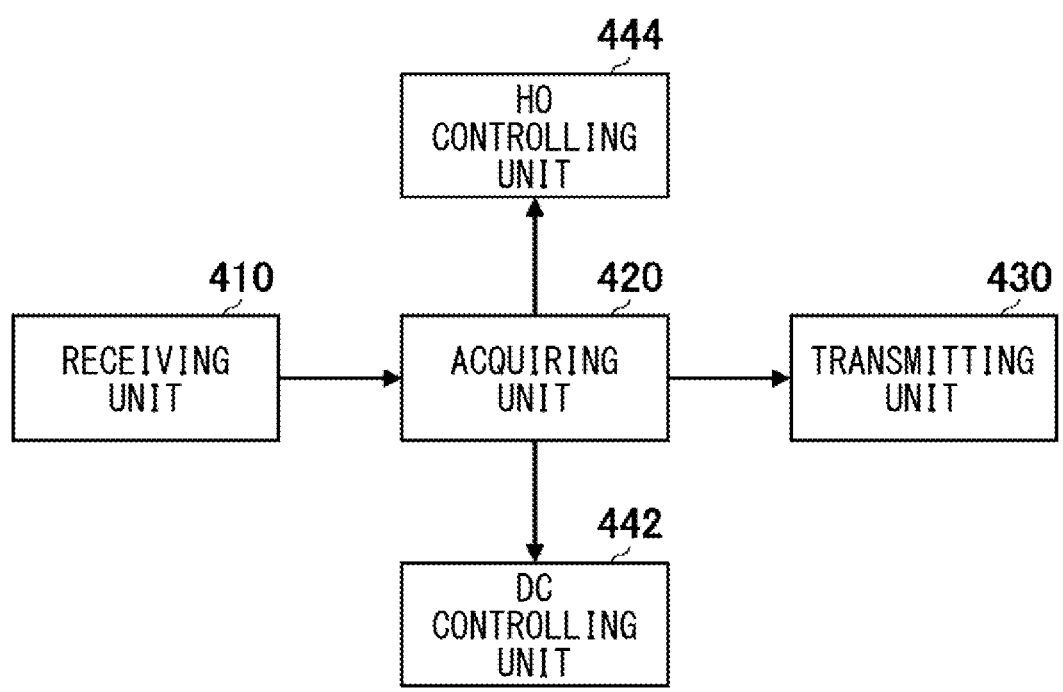
FIG. 9 schematically illustrates an example of a functional configuration of an EPC 400 or an MME 402 in a case that the wireless base station 100 is compliant with the LTE communication method.

FIG. 9 schematically illustrates an example of a functional configuration of an EPC 400 or an MME 402 in a case that the wireless base station 100 is compliant with the LTE communication method. When the wireless base station 100 is compliant with the 5G, the 5GC may be applied. The EPC 400 may be an example of a communication system. The MME 402 may be an example of the communication system.

The EPC 400, the MME 402, or the 5GC includes a receiving unit 410, an acquiring unit 420, a transmitting unit 430, a DC controlling unit 442, and an HO controlling unit 444. Note that each of the devices is not necessarily required to include all of these components. Herein, different points from the receiving unit 110, the acquiring unit 120, the transmitting unit 130, the DC controlling unit 142, and the HO controlling unit 144 are mainly described.

The receiving unit 410 receives, from the wireless base station 100, various pieces of information received by the receiving unit 110 of the wireless base station 100. The acquiring unit 420 acquires the various pieces of information received by the receiving unit 410. The transmitting unit 430 transmits, for example, the quality information acquired by the acquiring unit 420 to the wireless communication terminal 300. The transmitting unit 430 transmits, for example, the quality information to the wireless communication terminal 300 via the wireless base station 100. In addition, the transmitting unit 430 transmits, for example, the apparatus information acquired by the acquiring unit 420 to the wireless communication terminal 300. The transmitting unit 430 transmits, for example, the apparatus information to the wireless communication terminal 300 via the wireless base station 100.

The DC controlling unit 442 selects a secondary cell corresponding to the wireless communication terminal 300 when the wireless base station 100 provides the DC to the wireless communication terminal 300 as a primary cell. A method for selecting a secondary cell by the DC controlling unit 442 may be similar to that by the DC controlling unit 142.

The DC controlling unit 442 performs control such that the selected vehicle 200 is registered as a secondary cell corresponding to the wireless base station 100 in a case that the wireless base station 100 provides the DC to the wireless communication terminal 300 as a primary cell. The DC controlling unit 442 causes the wireless base station 100 to register the selected vehicle 200 as a secondary cell.

The HO controlling unit 444 controls a handover of the wireless communication terminal 300. The HO controlling unit 444 performs control such that a handover destination of the wireless communication terminal 300 becomes the selected vehicle 200. The method for selecting the handover destination by HO controlling unit 444 may be similar to that by the HO controlling unit 144. The HO controlling unit 444 controls, for example, such that the handover destination of the wireless communication terminal 300 becomes the vehicle 200 by including the identification of the selected vehicle 200 in a neighboring-cell list that the wireless base station 100 transmits to the wireless communication terminal 300.

Figure 10:
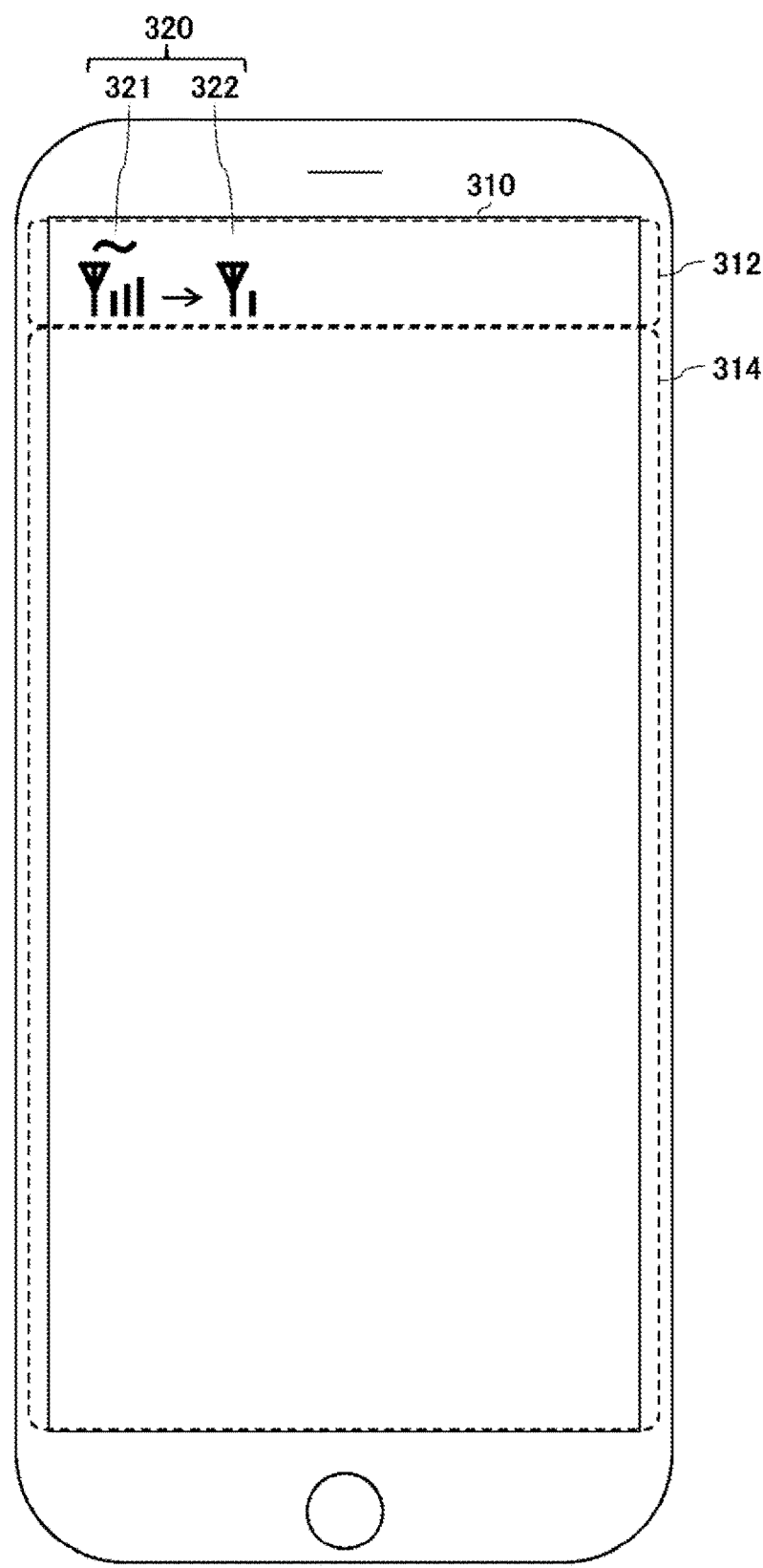
FIG. 10 schematically illustrates a display example by the wireless communication terminal 300.

FIG. 10 schematically illustrates a display example by the wireless communication terminal 300. When a communication apparatus that the wireless communication terminal 300 is camped on is camped on another communication apparatus, the wireless communication terminal 300 displays, on a display unit 310, an antenna-pict 320 representing a reception-intensity of a radio wave from the former communication apparatus at the latter communication apparatus, in addition to a reception-intensity of a radio wave from the former communication apparatus. For example, when the wireless communication terminal 300 is camped on the vehicle 200 that camped on the wireless base station 100, the wireless communication terminal 300 displays, on the display unit 310, an antenna-pict 320 that represents a reception-intensity of a radio wave from the wireless base station 100 at the vehicle 200 in addition to a reception-intensity of a radio wave from the vehicle 200.

The display unit 310 includes a display area 312 and a display area 314 having an area that is larger than the display area 312, and the wireless communication terminal 300 may display the antenna-pict 320 on the display area 312. The display area 312 may be an example of a first display area. The display area 314 may be an example of a second display area.

The antenna-pict 320 exemplified in FIG. 10 includes an icon 321 indicating a reception-intensity of a radio wave from the vehicle 200 and an icon 322 indicating a reception-intensity of a radio wave from the wireless base station 100 at vehicle 200. The wireless communication terminal 300 may display the icon 321 and the icon 322 to represent communication relations between the wireless communication terminal 300, the vehicle 200, and the wireless base station 100. In the example shown in FIG. 10, an arrow represents a communication relation.

The wireless communication terminal 300 may cause a display manner of the icon to change depending on whether a source of a radio wave is a stationary relaying apparatus that is installed fixedly or a mobile relaying apparatus. FIG. 10 shows an example of changing the display manner by attaching a symbol (—) in a case of the mobile relaying apparatus. Not limited to this example, for example, the icon 321 may be moved from right to left or up and down, flashed, colored, or displayed with gray-scale. In addition, as described below, the display of the icon 321 may be changed.

Figure 11:
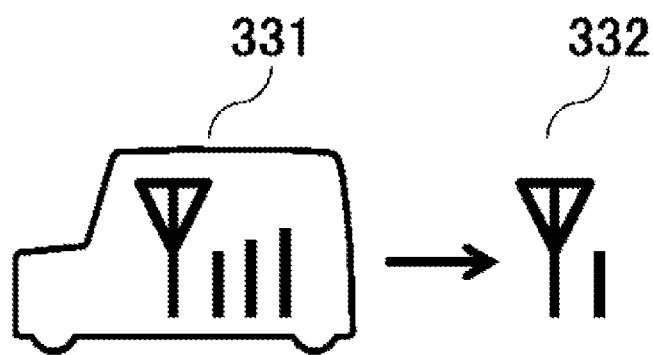
FIG. 11 illustrates an example of an antenna-pict 330.

FIG. 11 illustrates an example of an antenna-pict 330. The antenna-pict 330 exemplified in FIG. 11 includes an icon 331 indicating a reception-intensity of a radio wave from the vehicle 200 and an icon 332 indicating a reception-intensity of a radio wave from the wireless base station 100 at the vehicle 200. The icon 331 has an icon simulating an automobile in order to represent that the source of the radio wave is mobile relaying apparatus. FIG. 10 shows the example of attaching the symbol (~) in a case of the mobile relaying apparatus, but not limited thereto, the icon simulating an automobile may be used as shown in FIG. 11. In addition, as a method representing differences between the mobile relaying apparatus and the stationary relaying apparatus, any method other than these examples may be used.

Figure 12:
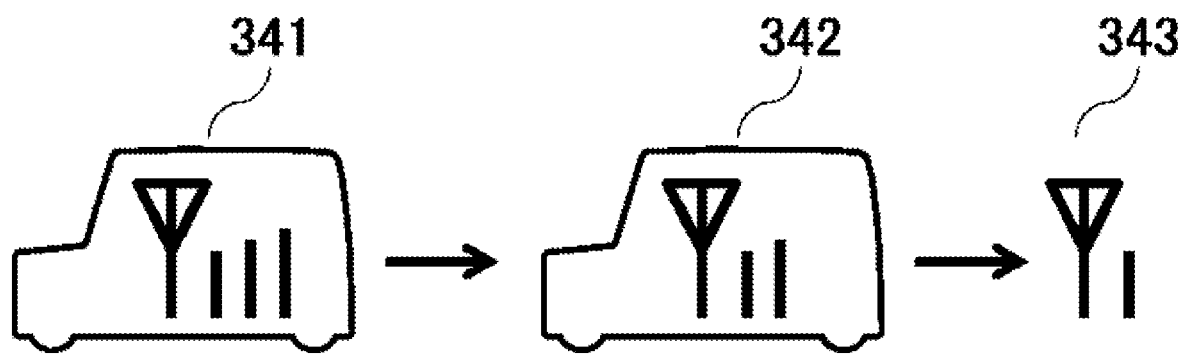
FIG. 12 illustrates an example of an antenna-pict 340.

FIG. 12 illustrates an example of an antenna-pict 340. When a plurality of communication apparatuses exists on a higher level of a communication apparatus on which the wireless communication terminal 300 camps, the wireless communication terminal 300 may display an antenna-pict 340 that represents each radio wave reception-intensity of the plurality of communication apparatuses and communication relations. The antenna-pict 340 illustrated in FIG. 12 includes an icon 341 indicating a reception-intensity of a radio wave from a first mobile relaying apparatus on which the wireless communication terminal 300 camps, an icon 342 indicating a reception-intensity of a radio wave at the first mobile relaying apparatus from a second mobile relaying apparatus on which the first mobile relaying apparatus camps, and an icon 343 indicating a reception-intensity of a radio wave at the second mobile relaying apparatus from the wireless base station 100 on which a second mobile relaying apparatus camps.

Figure 13:
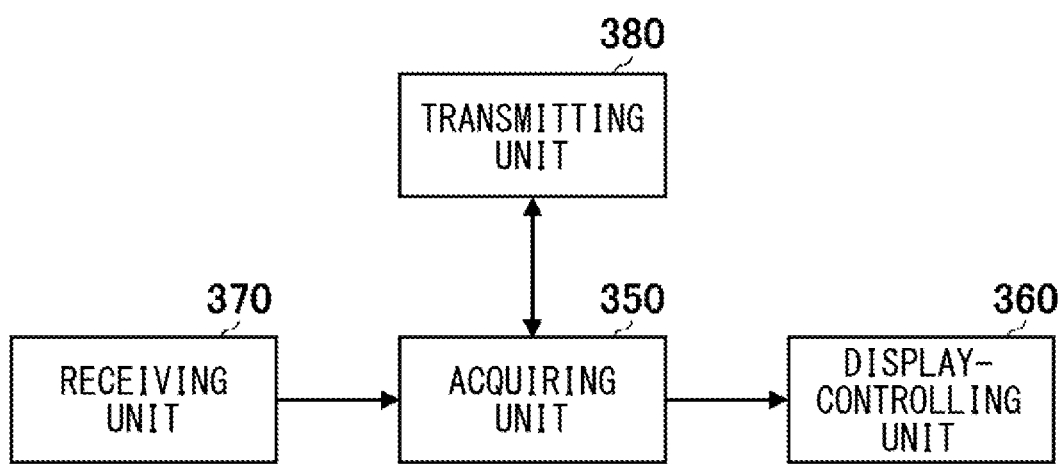
FIG. 13 schematically illustrates an example of a functional configuration of the wireless communication terminal 300.

FIG. 13 schematically illustrates an example of a functional configuration of the wireless communication terminal 300. The wireless communication terminal 300 includes an acquiring unit 350, a display-controlling unit 360, a receiving unit 370, and a transmitting unit 380.

The acquiring unit 350 acquires first information on a communication quality of a wireless connection between a first communication apparatus that relays communications between the wireless communication terminal 300 and a second communication apparatus, and the wireless communication terminal 300. In addition, the acquiring unit 350 acquires second information on a communication quality of a wireless connection between the first communication apparatus and the second communication apparatus. When one or more communication apparatuses further exist on a higher level of the second communication apparatus, the acquiring unit 350 may acquire information on a communication quality of a wireless connection between respective apparatuses.

The communication quality of the wireless connection is, for example, a radio wave reception-intensity. The communication quality of the wireless connection may be noise information. The communication quality of the wireless connection may be a communication speed.

For example, the acquiring unit 350 acquires the first information indicating a reception-intensity of a radio wave from the first communication apparatus at the wireless communication terminal 300 and the second information indicating a reception-intensity of a radio wave from the second communication apparatus at the first communication apparatus. Note that the acquiring unit 350 may acquires, as an alternative, the first information indicating a reception-intensity of a radio wave from the wireless communication terminal 300 at the first communication apparatus and the second information indicating a reception-intensity of a radio wave from the first communication apparatus at the second communication apparatus.

The display-controlling unit 360 performs control such that the first information and the second information acquired by the acquiring unit 350 are caused to be displayed on the display unit 310. The display-controlling unit 360 may cause each of the first information and the second information to be displayed as an icon. The display-controlling unit 360 may cause the first information and the second information to be displayed on the display unit 310, such that a communication relation that the wireless communication terminal 300 communicates with the second communication apparatus via the first communication apparatus is represented. For example, the display-controlling unit 360 shows the communication relation with an arrow as in the antenna-pict 320, the antenna-pict 330, and the antenna-pict 340.

The display-controlling unit 360 may perform control such that the first information is caused to be displayed in different manners depending on whether the first communication apparatus is a stationary relaying apparatus or a mobile relaying apparatus. The display-controlling unit 360 controls, for example, such that the first information is caused to be displayed as different icons depending on whether the first communication apparatus is a stationary relaying apparatus or a mobile relaying apparatus.

For example, the display-controlling unit 360 causes an icon without a symbol (~) to be displayed when the first communication apparatus is a stationary relaying apparatus or an icon with the symbol (~) attached when the first communication apparatus is a mobile relaying apparatus. In addition, the display-controlling unit 360 causes, for example, an icon simulating an automobile to be displayed when the first communication apparatus is a mobile relaying apparatus. Differences in the display manners of the first communication apparatus between the stationary relaying apparatus and the mobile relaying apparatus are not limited to these icons, and may be any differences. The same may be true for the second communication apparatus. In addition, when one or more communication apparatuses further exist on a higher level of the second communication apparatus, the same may be true for these communication apparatuses.

The display-controlling unit 360 may perform control such that the first information and the second information are caused to be displayed on the display area 312. Note that the display-controlling unit 360 may perform control such that the first information and the second information are caused to be displayed on the display area 314.

The acquiring unit 350 may further acquire movement-related information related to movements of the first communication apparatus when the first communication apparatus is a mobile relaying apparatus. The display-controlling unit 360 may cause the first information to be displayed on the display unit 310 by using the movement-related information acquired by the acquiring unit 350. For example, when the movement-related information includes moving speed information, the display-controlling unit 360 causes the first information to be displayed on the display unit 310 to represent a moving speed of the first communication apparatus. More specifically, the display-controlling unit 360 causes the first information to be displayed with an icon having a color corresponding to a moving speed of the first communication apparatus. For example, the display-controlling unit 360 causes the first information to be displayed with a darker red-colored icon as the moving speed is faster. As a method for representing a moving speed, any method can be adopted. For example, the display-controlling unit 360 may cause a letter or a numerical value representing a moving speed to be displayed along with an icon. The same may be true for the second communication apparatus. In addition, when one or more communication apparatuses further exist on a higher level of the second communication apparatus, the same may be true for these communication apparatuses.

This enables a user of the wireless communication terminal 300 to know a moving speed of the mobile relaying apparatus with the wireless communication terminal 300 directly or indirectly connected. The user of the wireless communication terminal 300 can consider changing a connection destination to another mobile relaying apparatus or other things, for example, when the moving speed of the mobile relaying apparatus connected is faster.

The receiving unit 370 receives various pieces of information. The receiving unit 370 receives, for example, quality information transmitted by the transmitting unit 430. The acquiring unit 350 may acquire the quality information from the receiving unit 370. In addition, the receiving unit 370 receives, for example, apparatus information transmitted by the transmitting unit 430. The acquiring unit 350 may acquire the apparatus information from the receiving unit 370.

The transmitting unit 380 transmits various pieces of information. The transmitting unit 380 transmits, for example, a measurement report to the wireless base station 100 on which the wireless communication terminal 300 camps.

Figure 14:
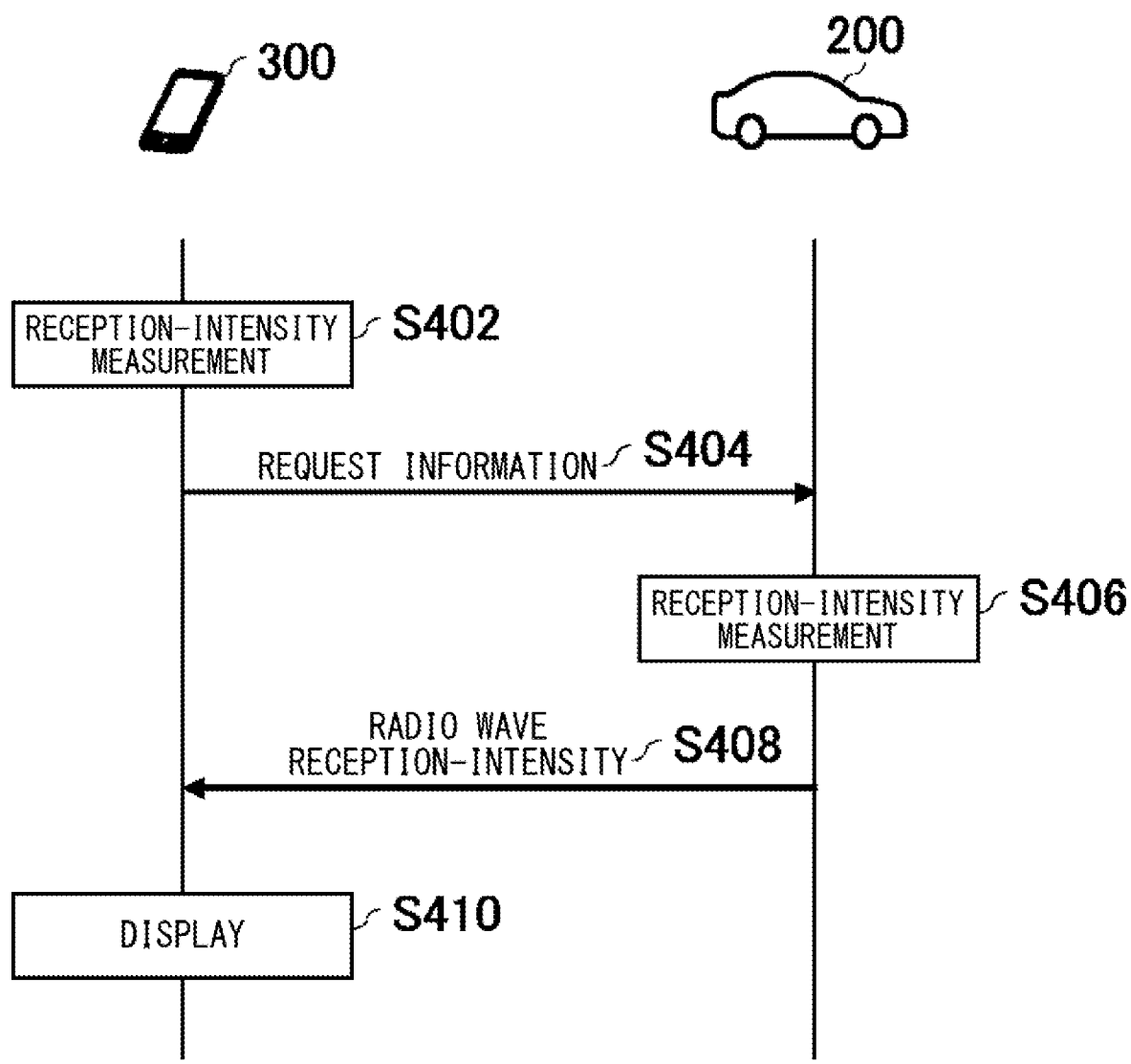
FIG. 14 schematically illustrates an example of flow of processes performed by the wireless communication terminal 300.

FIG. 14 schematically illustrates an example of a flow of processes performed by the wireless communication terminal 300. In a situation the wireless communication terminal 300 is camped on the first communication apparatus that is camped on the second communication apparatus, the wireless communication terminal 300 may receive a reception-intensity of a radio wave from the second communication apparatus at the first communication apparatus, not from the wireless base station 100 but from the first communication apparatus. In FIG. 14, a case that the first communication apparatus is the vehicle 200 and the second communication apparatus is the wireless base station 100 is described as an example.

At S402, the wireless communication terminal 300 measures a reception-intensity of a radio wave from the vehicle 200. At S404, the transmitting unit 380 transmits request information requesting a radio wave reception-intensity to the vehicle 200.

At S406, in response to receiving the request information, the vehicle 200 measures the reception-intensity of the radio wave from the wireless base station 100. At S408, the vehicle 200 transmits the radio wave reception-intensity measured at S406 to the wireless communication terminal 300.

At S410, the display-controlling unit 360 causes an antenna-pict to be displayed on the display unit 310, which includes both an icon indicating the radio wave reception-intensity measured at S402 and an icon indicating the radio wave reception-intensity received by the receiving unit 370 at S408.

Figure 15:
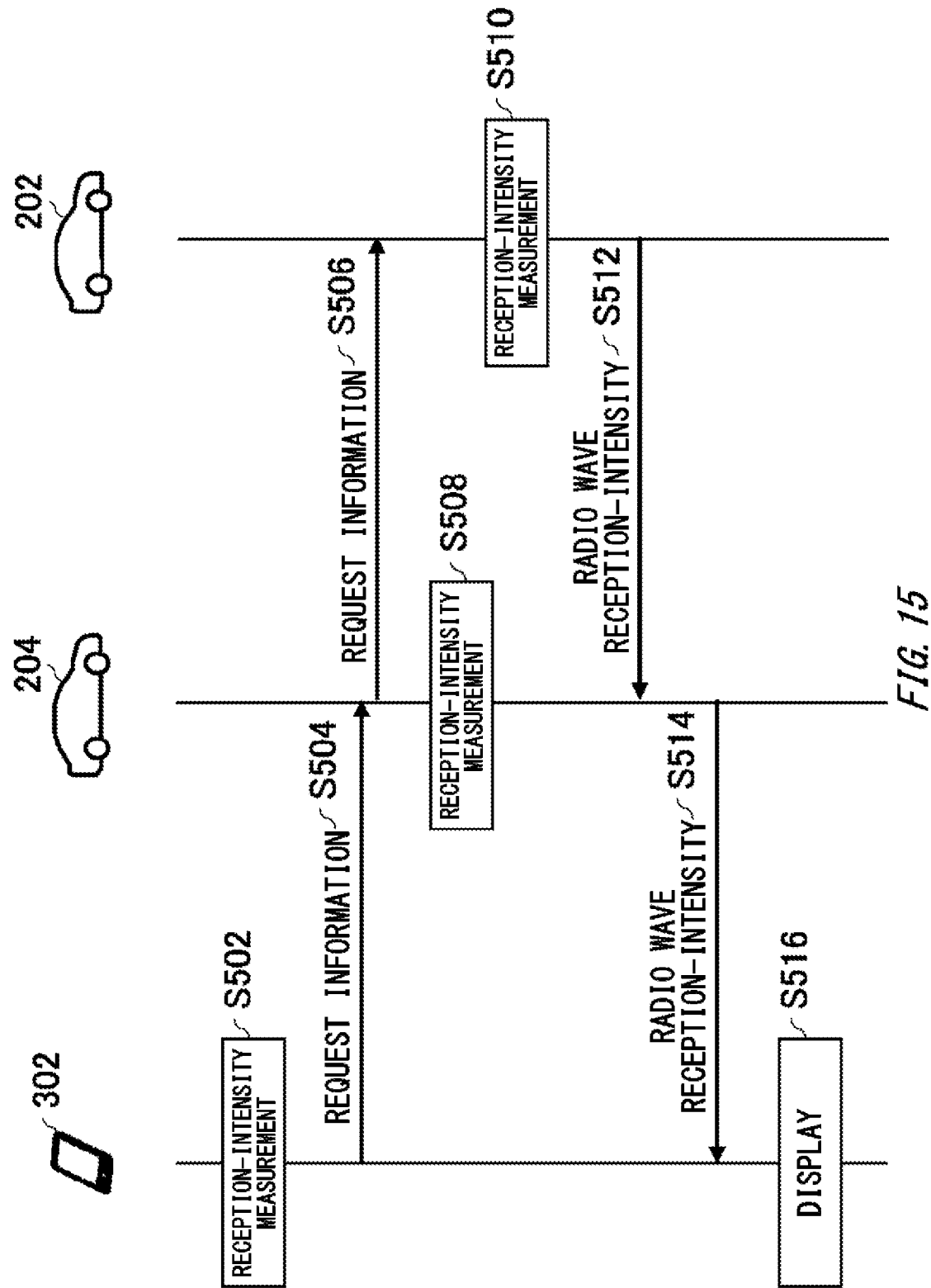
FIG. 15 schematically illustrates an example of a flow of processes performed by the wireless communication terminal 300.

FIG. 15 schematically illustrates an example of a flow of processes performed by the wireless communication terminal 302 in the situation shown in FIG. 1. At S502, the wireless communication terminal 302 measures a reception-intensity of a radio wave from the vehicle 204. At S504, the transmitting unit 380 of the wireless communication terminal 302 transmits request information requesting a radio wave reception-intensity to the vehicle 204.

At S506, the vehicle 204 that has received the request information at S504 transmits request information requesting a radio wave reception-intensity to the vehicle 202. At S508, the vehicle 204 measures a reception-intensity of a radio wave from the vehicle 202. At S510, the vehicle 202 that has received the request information at S506 measures a reception-intensity of a radio wave from the wireless base station 100.

At S512, the vehicle 202 transmits the radio wave reception-intensity measured at S510 to the vehicle 204. At S514, the vehicle 204 transmits, to the wireless communication terminal 302, the radio wave reception-intensity received from the vehicle 202 at S510 and the radio wave reception-intensity measured at S508.

At S516, the display-controlling unit 360 of the wireless communication terminal 302 causes an icon-pict to be displayed on the display unit 310, which includes an icon indicating the radio wave reception-intensity measured at S502, and an icon indicating the reception-intensity of the radio wave from the wireless base station 100 at the vehicle 202 and an icon indicating the reception-intensity of the radio wave from the vehicle 202 at the vehicle 204 both of which are received at S514.

Figure 16:
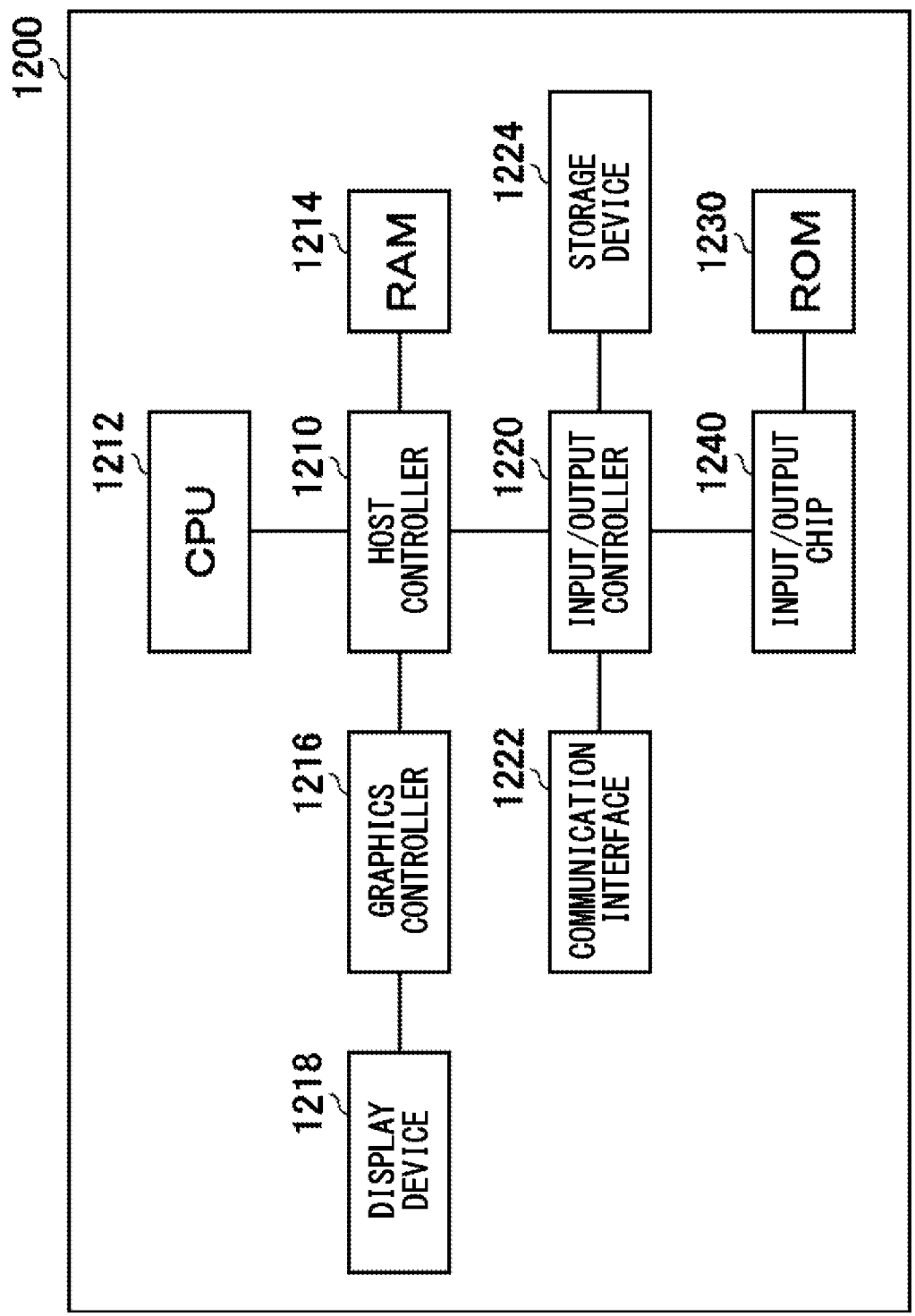
FIG. 16 schematically illustrates an example of a hardware configuration of a computer 1200 functioning as the wireless base station 100, the wireless communication terminal 300, the EPC 400 or the MME 402.

FIG. 16 schematically illustrates an example of a hardware configuration of a computer 1200 functioning as the wireless base station 100, the wireless communication terminal 300, the EPC 400, or the MME 402. A program installed on the computer 1200 can cause the computer 1200 to function as one or more "units" of apparatuses according to the above embodiments, or cause the computer 1200 to execute operations associated with the apparatuses according to the above embodiments or the one or more "units", and/or can cause the computer 1200 to execute the processes according to the above embodiments or steps of the processes. Such a program may be executed by the CPU 1212 to cause the computer 1200 to perform certain operations associated with some or all of the blocks of flow charts and block diagrams described herein.

The computer 1200 according to this embodiment includes a CPU 1212, a RAM 1214, and a graphics controller 1216, which are interconnected by a host controller 1210. The computer 1200 also includes an input/output unit such as a communication interface 1222, a storage device 1224, and an IC card drive, which are connected to the host controller 1210 via an input/output controller 1220. The storage device 1224 may be a hard disk drive, a solid-state drive, and the like. The computer 1200 also includes a legacy input/output unit such as a ROM 1230 and a touch panel, which are connect to the input/output controller 1220 via an input/output chip 1240.

The CPU 1212 operates according to programs stored in the ROM 1230 and the RAM 1214, thereby controlling each unit. The graphics controller 1216 acquires image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 in the computer 1200. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

The programs are provided by a computer-readable storage medium such as an IC card. The programs are read from the computer-readable storage medium, installed into the storage device 1224, the RAM 1214, or the ROM 1230, which is also an example of the computer-readable storage medium, and executed by the CPU 1212. The information processing described in the programs is read into the computer 1200, resulting in cooperation between the programs and the above various types of hardware resources. An apparatus or method may be constituted by implementing the operation or processing of information in accordance with the use of the computer 1200.

For example, when communication is performed between the computer 1200 and an external device, the CPU 1212 may perform a communication program loaded onto the RAM 1214 to instruct, based on the processing described in the communication program, communication processing to the communication interface 1222. The communication interface 1222, reads, under control of the CPU 1212, transmission data stored in a transmission buffer region provided in a recording medium such as the RAM 1214, the storage device 1224, or the IC card, to transmit the read transmission data to the network, or writes reception data received from the network into a reception buffer region or the like provided onto the recording medium.

In addition, the CPU 1212 may cause the RAM 1214 to read all or necessary parts of files and database stored in the external recording medium such as the storage device 1224 or the IC card, and perform various types of processing on the data on the RAM 1214. Then, the CPU 1212 may write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, information processing, condition judging, conditional branch, unconditional branch, search/replacement of information, etc., as described throughout this disclosure and specified by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is specified, from among the plurality of entries, and read the attribute value of the second attribute stored in the entry, thereby acquiring the attribute value of the second attribute associated with the first attribute satisfying the predetermined condition.

The above-explained program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flow charts and block diagrams in the above embodiments may represent steps of processes in which operations are performed or units of apparatuses responsible for performing operations. Certain steps and units may be implemented by dedicated circuitry, programmable circuitry supplied with computer-readable instructions stored on computer-readable storage medium, and/or processors supplied with computer-readable instructions stored on computer-readable storage medium. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

The computer-readable storage medium may include any tangible device that can store instructions for execution by a suitable device, such that the computer-readable storage medium having instructions stored therein comprises an article of manufacture including instructions which can be executed to create means for performing operations specified in the flow charts or block diagrams. Examples of the computer-readable storage medium may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to generate means for performing operations specified in the flow charts or block diagrams. Examples of processors include computer processors, processing units, microprocessors, digital signal processors, controllers, microcontrollers, etc.

The above embodiments have been described exemplifying the vehicle 200 as an example of the mobile relaying apparatus, but is not limited thereto. An unmanned aircraft etc. like a drone may be adopted as a mobile relaying apparatus.

While the present invention has been described by using the embodiments, the technical scope of the invention is not limited to the scope of the embodiments described above. It is apparent to persons skilled in the art that various alterations or improvements can be added to the embodiments described above. It is also apparent from the description of the claims that the embodiments added with such alterations or improvements can be included in the technical scope of the invention.

An execution order of each process of the operations, procedures, steps, stages, and the like performed by an apparatus, system, program, and method shown in the claims, the specification, and drawings can be implemented in any order as long as the order is not expressed clearly by "prior to," "before," or the like and as long as the output from a previous process is not used in a later process. Even if the process flow is described using phrases such as "first" or "next" in the claims, the specification, and drawings, it does not necessarily mean that the process must be performed in this order.

EXPLANATION OF REFERENCES

10: communication system, 20: network, 30: road, 40, 42: mountain, 100: wireless base station, 102: cell, 110: receiving unit, 120: acquiring unit, 130: transmitting unit, 142: DC controlling unit, 144: HO controlling unit, 200, 202, 204, 206, 208: vehicle, 203, 205, 207: cell, 300, 302, 304, 306, 308, 309: wireless communication terminal, 310: display unit, 312, 314: display area, 320, 330, 340: antenna-pict, 321, 322, 331, 332, 341, 342, 343: icon, 350: acquiring unit, 360: display-controlling unit, 370: receiving unit, 380: transmitting unit, 400: EPC, 402: MME, 404: SGW, 410: receiving unit, 420: acquiring unit, 430: transmitting unit, 442: DC controlling unit, 444 HO controlling unit, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip

What is claimed is:

1. A communication system comprising:
  at least one processor;
  an acquiring unit that uses the at least one processor to acquire quality information on a wireless communication quality between a wireless base station and a movable mobile relaying apparatus that relays communications between the wireless base station and wireless communication terminals; and
  a transmitting unit that uses the at least one processor to transmit the quality information to the wireless communication terminals, wherein
  the acquiring unit uses the at least one processor to further acquire movement-related information related to movements of the mobile relaying apparatus, and
  the transmitting unit uses the at least one processor to further transmit the movement-related information to the wireless communication terminals.

2. The communication system according to claim 1, wherein
  the movement-related information includes at least one of moving speed information related to moving speed of the mobile relaying apparatus and moving direction information related to a moving direction of the mobile relaying apparatus.

3. The communication system according to claim 2, wherein
  the movement-related information includes the moving speed information,
  each of the wireless communication terminals includes a display-controlling unit that uses the at least one processor to control a display on a display unit thereof, and
  the display-controlling unit uses the at least one processor to cause first information according to the quality information to be displayed on the display unit such that the moving speed of the mobile relaying apparatus is represented.

4. A communication system comprising:
  at least one processor;
  an acquiring unit that uses the at least one processor to acquire quality information on a wireless communication quality between a wireless base station and a movable mobile relaying apparatus that relays communications between the wireless base station and wireless communication terminals; and
  a transmitting unit that uses the at least one processor to transmit the quality information to the wireless communication terminals, wherein
  the acquiring unit uses the at least one processor to acquire (i) a plurality of pieces of quality information of the wireless base station and each of a plurality of mobile relaying apparatuses and (ii) a plurality of pieces of moving speed information related to moving speed of the plurality of mobile relaying apparatuses, and the communication system further comprises a DC controlling unit that uses the at least one processor to select a secondary cell for the wireless base station from the plurality of mobile relaying apparatuses based on the plurality of pieces of quality information and the plurality of pieces of moving speed information, when the wireless base station provides, as a primary cell, dual connectivity to the wireless communication terminals.

5. The communication system according to claim 4, wherein the DC controlling unit uses the at least one processor to select, among the plurality of mobile relaying apparatuses having a radio wave reception-intensity included in the quality information stronger than a predetermined intensity, the secondary cell by putting a priority on a mobile relaying apparatus having the moving speed slower than the moving speed of other mobile relaying apparatuses.

* * * * *